United States Patent [19]

Hyman

[11] Patent Number: 5,334,243
[45] Date of Patent: Aug. 2, 1994

[54] CRACK INHIBITOR FOR TAPE JOINT COMPOSITIONS

[75] Inventor: Larry N. Hyman, Midland, Mich.

[73] Assignee: The Dow Chemical Company, Midland, Mich.

[21] Appl. No.: 57,238

[22] Filed: May 4, 1993

[51] Int. Cl.$^5$ .................... C04B 26/02; C04B 26/20
[52] U.S. Cl. .................... 106/794; 106/795; 106/316; 106/819; 106/194; 106/197.1
[58] Field of Search .............. 106/794, 795, 316, 819, 106/194, 197.1

[56] References Cited

U.S. PATENT DOCUMENTS

| | | | |
|---|---|---|---|
| 3,303,147 | 2/1967 | Elden | 260/8 |
| 3,411,926 | 11/1968 | Gogek et al. | 106/210 |
| 3,793,269 | 2/1974 | Bruschtein et al. | 260/17 |
| 3,835,074 | 9/1974 | Desmarais | 260/17 |
| 3,891,453 | 6/1975 | Williams | 106/85 |
| 3,891,582 | 6/1975 | Desmarais | 260/17 R |
| 3,900,434 | 8/1975 | Bruschtein et al. | 260/17 R |
| 3,907,725 | 9/1975 | Forte et al. | 260/17 R |
| 3,998,769 | 12/1976 | Lane et al. | 260/17.4 ST |
| 4,454,267 | 6/1984 | Williams | 324/43 |
| 4,558,079 | 12/1985 | Desmarais | 524/43 |
| 4,594,108 | 6/1986 | Greminger, Jr. et al. | 106/170 |
| 4,657,594 | 4/1987 | Struss | 106/675 |
| 4,686,253 | 8/1987 | Struss et al. | 106/675 |
| 4,720,303 | 1/1988 | Soldatos | 106/181 |
| 4,799,962 | 1/1989 | Ahmed | 106/188 |
| 4,824,879 | 4/1989 | Montgomery et al. | 524/43 |
| 4,846,889 | 7/1989 | Meyer | 106/115 |
| 4,939,192 | 7/1990 | t'Sas | 524/44 |
| 5,102,462 | 4/1992 | Podlas | 106/181 |
| 5,277,712 | 1/1994 | McInnis | 106/774 |

FOREIGN PATENT DOCUMENTS

0118637A2 9/1984 European Pat. Off.
0119012A2 9/1984 European Pat. Off.

*Primary Examiner*—David Brunsman

[57] ABSTRACT

The use of calcium oxide or calcium hydroxide as a crack-inhibiting additive for tape joint compositions is disclosed. Tape joint compositions containing calcium oxide or calcium hydroxide maintain their workability while experiencing less cracking upon drying.

3 Claims, No Drawings

CRACK INHIBITOR FOR TAPE JOINT COMPOSITIONS

BACKGROUND OF THE INVENTION

This invention relates to compositions useful as tape joint sealing materials for installation of wallboard paneling. In particular, the invention relates to tape joint compounds which have an improved resistance to cracking during drying.

For many years, wallboard has been a standard material used to erect interior walls in the construction of buildings. Wallboard is typically installed in large panels that are nailed and glued to wall studs and fitted together until the wall section is covered. The joints where sections of board are butted together are covered with tape and the tape joints and all the nails are covered with a joint cement or tape joint compound. Upon hardening, the tape joint compound is sanded smooth so that it is imperceptible under paint or other wall covering.

Tape joint compounds typically comprise limestone, clay, mica, a binder, a thickener, and a stabilizer as the primary dry ingredients. Water is also the primary wet ingredient and may either be added to the dry ingredients by a manufacturer to form a ready-to-use mixture or added to the dry ingredients just prior to use by the actual user. In either ease, the tape joint compound will generally be a viscous, but workable, mass that is applied to a wall by troweling or other well-known methods.

The water demand to obtain a tape joint composition with the desired consistency will vary based upon several factors, including the viscosity of the thickener. In general, the water demand increases as the thickener viscosity increases. As more water is added to the formulation, its propensity to crack upon drying is increased. U.S. Pat. No. 4,558,079 discusses the tendency of water-soluble polymers used as thickeners, such as methylhydroxypropylcellulose (MHPC) and hydroxyethylcellulose (HEC), to adsorb to the surface of the clay used in the formulation, which can lead to mild flocculation. The flocculated particles leave crevices or voids which result in cracks when the compound drys. As such, it would be desirable to reduce the propensity of a tape joint compound to crack upon drying.

To aid in avoiding cracking and shrinkage of an aqueous adhesive for wall board compound upon drying, while maintaining a proper viscosity, U.S. Pat. 5,102,462 discloses the inclusion of a 3-n-butoxy-2-hydroxypropyl hydrophobically-modified hydroxy-cellulose with a crosslinked polyacrylic acid at a pH of 7 to 10. U.S. Pat. No. 4,558,079 discloses tape joint cement compositions which contain 0.2 to 2.0 percent by weight based on dry ingredients, of at least one hydroxypropylhydroxyethylcellulose having a hydroxyethyl substitution of 0.5 to 4.0 molecular substitution (M.S.) and a hydroxypropyl substitution greater than 0.36 to about 1.5 M.S. as a water retention aid and thickener. These cellulose derivatives were reported to have less of a tendency to adsorb to the surface of clays, particularly attapuligite, than either hydroxyethylcellulose or methylethylcellulose.

Despite what is known concerning joint compound formulations, there remains a need for improved tape joint compositions which have a reduced propensity for cracking upon drying and yet maintain the proper viscosity and workability for application to wall joints.

SUMMARY OF THE INVENTION

The present invention is the use of calcium oxide or calcium hydroxide as a crack-inhibiting additive to a tape joint composition.

The present invention is also a composition useful as a crack inhibitor additive in a tape joint composition, the additive comprising:
a. between about 15 to about 80 weight percent of a surface-treated cellulose ether; and
b. between 20 to about 85 weight percent, of calcium oxide, calcium hydroxide or a mixture thereof;
wherein the weight percent is based on the total weight of the additive.

The present invention is also a tape joint compound composition comprising a mixture of:
a. limestone,
b. clay,
c. mica,
d. a surface-treated cellulose ether,
e. a binder, and
f. calcium oxide, calcium hydroxide, or a mixture thereof.

The present invention is also a tape joint composition having limestone, mica, clay and a binder as principle ingredients, the improvement which comprises using an effective amount of a crack inhibiting additive wherein the additive is a mixture of:
a. between about 15 to about 80 weight percent of a surface-treated cellulose ether; and
b. between 20 to about 85 weight percent of calcium oxide, calcium hydroxide or a mixture thereof,
wherein the weight percent is based on the total weight of the additive.

The addition of the calcium oxide, calcium hydroxide or a mixture thereof to a tape joint composition containing a surface-treated cellulose ether reduces the water demand of the composition without affecting the creaminess and workability of the composition. A reduction in the water demand results in greater crack resistance of the tape joint composition upon drying.

DETAILED DESCRIPTION OF THE INVENTION

Surprisingly, it has been discovered that the addition of calcium oxide, calcium hydroxide or a mixture thereof to a tape joint composition reduces the propensity of the composition to crack upon drying while generally maintaining the workability characteristics of the composition during its use.

As used herein, the terms "tape joint compound" and "tape joint composition" are recognized terms and mean a product for concealing joints between wallboard used in residential, commercial or industrial building. It is to be appreciated by those of ordinary skill in the art that a tape joint composition may generally comprise a wide variety of materials. In commercial practice the concentration of the principal ingredients can vary widely between suppliers and is based upon the particular end use.

The term "effective amount" means the minimum amount of the additives of the present invention, or mixtures thereof, which is necessary to achieve crack inhibition of a tape joint composition. "Workability" of a tape joint composition refers to its ability to be spread on the wallboard.

One factor believed to affect the propensity of a tape joint composition to crack upon drying is the amount of water used to prepare the composition. Water is generally necessary to achieve a desired creaminess or workability so that the tape joint compound mixture may be easily applied to a wall or other structure. Increasing the water content above about 35 weight percent of the formulation increases the workability of the mixture but typically results in unacceptable levels of drying, cracking and shrinkage. Therefore, it is desirable to reduce the amount of water needed to be added to a tape joint composition in order to achieve the desired consistency or workability properties so that the cracking of the composition is minimized upon its drying.

A tape joint composition will typically comprise limestone, clay, mica, a binder and a thickener. Tape joint compositions are marketed as dry powders or as a fully formulated ready-to-use product, i.e., already containing water. In most commercial formulations, the principal ingredients are within the following concentration ranges, the concentration as percent by weight based upon the dry ingredient: limestone, 40 to 95 percent; mica, 2 to 10 percent; clay, 1 to 30 percent; binder 2 to 15 percent; and thickener 0.2 to 3.0 percent. If the product is to be sold as a ready-to-use formulation, water in the amount of about 20 to about 35 percent based on the total weight of the composition is added and thoroughly mixed. Preferably, the water content is in the amount of about 22 to about 32 percent.

In a tape joint composition, limestone generally refers to pulverized sedimentary rock composed mainly of calcium carbonate and mica generally refers to any of several laminated silica minerals which characteristically cleave into thin sheets.

Clay added to tape joint composition is generally a hydrated aluminum silicate such as attapulgite, kaolinite, bentonite or montmorillonite. Attapulgite is generally the preferred clay for use in tape joint compounds as it aids in preventing sag of the joint compound.

A binder is a material added to the joint compound to hold solid substances together. The binder in a tape joint composition is generally a vinyl material, such as polyvinyl acetate, a polyvinyl alcohol or an ethylenevinyl acetate copolymer, which upon drying or curing of the tape joint compound forms a thin matrix to hold the components together. When a fully formulated mix is being prepared, a latex binder is usually added. Other materials useful as binders include, for example, starch, casein, polyacrylamide and copolymers of polyacrylamide and acrylic acid.

In addition to the principal ingredients mentioned above, a tape joint composition may also contain small amounts of additives such as dispersants, defoamers and preservatives.

Principal thickeners used in tape joint compounds are cellulose ether derivatives. The cellulose ethers useful in the present invention are those which are water-soluble. As used herein, the term "water-soluble" means that two grams of a cellulose ether of the present invention can be dispersed by stirring into 100 grams of water to provide a substantially clear solution when dissolved.

The preferred cellulose ethers for use in the present invention are those which are surface-treated. As used herein, the term "surface-treated" means that they can be readily dispersed in cold water. That is, dispersibility is improved by chemical or physical treatments that delay particle hydration and inhibit aggregation. Chemical treatments include reagents that produce a hydrolyzable crosslink or complex, coating particles with hydrophobic polymers and dry blending with salt or effervescing salt combinations. See, for example, *Encyclopedia of Polymer Science and Engineering*, John Wiley & Sons (vol. 3, 1985), the disclosure of which is hereby incorporated by reference.

Examples of water-soluble, surface-treated cellulose ethers which are useful in the present invention include such known water-soluble cellulose ethers as methylcellulose, methylethylcellulose, hydroxypropyl methylcellulose, hydroxypropyl cellulose, and hydroxyethyl methylcellulose. Mixtures of such known water-soluble surface-treated cellulose ethers may also be used in the present invention. The preferred water-soluble, surface-treated cellulose ethers for use in the present invention are methylcellulose and hydroxypropyl methylcellulose. The most preferred water-soluble surface-treated cellulose ether for use in the present invention is hydroxypropyl methylcellulose.

Descriptions of suitable water-soluble cellulose ethers, which meet the criteria of the present invention as described herein, can be found in the following references: alkyl and hydroxyalkylalkylcellulose (Chapter 3), hydroxyethylcellulose (Chapter 12), and hydroxypropyl cellulose (Chapter 13) in *Handbook of Water-Soluble Gums and Resins*, ed. R. L. Davidson, pub. McGraw-Hill (1980).

Surface-treated cellulose ethers are readily available commercially, such as, Methocel (R) hydroxypropyl methylcellulose, available from The Dow Chemical Company (Midland, Mich.), where the hydroxypropyl methylcellulose contains a polyglycol, a carboxylic acid and an aidehyde as surface treatment.

The water-soluble cellulose ethers used in the present invention may be of any viscosity grade which are effective in providing the necessary viscosity and workability of the tape joint composition. Generally, the water-soluble cellulose ethers used in the present invention have a viscosity between from about 100 centipoise (cps) (100 mPa-s) to about 400,000 cps (400,000 mPa.s). Unless otherwise indicated, all water-soluble cellulose ether viscosities described herein are intended to represent the calculated viscosity of the particular water-soluble cellulose ether as a 2 weight percent aqueous solution at 20° C. Preferably, the water-soluble cellulose ethers for use in the present invention exhibit a viscosity between from about 4,000 cps (4,000 mPa.s) to about 100,000 cps (100,000 mPa.s). More preferably, the water-soluble cellulose ethers used in the present invention exhibit a viscosity between from about 40,000 cps (40,000 mPa.s) to about 100,000 cps (100,000 mPa.s).

When using a surface-treated cellulose ether as the thickener in the tape joint composition, it has been found that by using calcium oxide, calcium hydroxide or a mixture thereof as a crack-inhibiting additive, the water demand for the tape joint composition mixture is reduced. Typically, such reduction of the tape joint composition mixture's water demand is approximately 7.5 percent, based on the total water used in an equivalent tape joint composition mixture not using the calcium oxide, calcium hydroxide or mixture thereof.

The addition of calcium oxide, calcium hydroxide or mixture thereof is added to a tape joint composition in an amount sufficient to exhibit a crack inhibiting affect without having a detrimental affect on the workability characteristics of the composition. In general, the concentration is between about 0.025 and 2.0 weight percent, based on the total weight of the tape joint compound mixture. Preferably, the additive is between about 0.05 and 1.5 weight percent. More preferred is the addition of about 0.08 and 1.3 weight percent of the additive.

The calcium oxide, calcium hydroxide or mixture thereof can be combined with the surface-treated cellulose ether and used as an additive for a joint tape composition to inhibit cracking of the compound upon drying. The composition useful as a crack inhibitor additive in a tape joint composition is an additive which comprises:

a. between about 15 to about 80 weight percent of a surface-treated cellulose ether; and
b. between 20 to about 85 weight percent, of calcium oxide, calcium hydroxide or a mixture thereof; wherein the weight percent is based on the total weight of the additive.

The combined amount of surface-treated cellulose ether, calcium oxide and calcium hydroxide present in the tape joint compound is that amount which will reduce cracking of the tape joint composition but which does not adversely affect the workability. In general, the amount of calcium oxide, calcium hydroxide and surface-treated cellulose ether, in the ratios given above, are added to a tape joint composition from between about 0.025 to about 5.0 percent of the total weight of the joint tape composition. Preferably, an additive of calcium oxide, calcium hydroxide and surface-treated cellulose ether is between about 0.05 and 3.0 weight percent.

When using calcium oxide or calcium hydroxide in a tape joint composition, it is preferable that the calcium oxide or calcium hydroxide first be mixed with the other dry components of the tape joint compound mixture. The dry mixture, including the calcium oxide or calcium hydroxide, may then be mixed with the fluid or wet components. This will ensure that a homogeneous tape joint compound is formulated.

The invention will be further clarified by a consideration of the following examples, which are intended to be purely exemplary of the present invention.

EXAMPLES

In the following examples, tape joint compositions are formulated in the laboratory by: mixing the dry components for at least one minute, pouring the fluid components into the dry components while mixing, continuing to mix for ten minutes after all of the fluid components have been added, and determining the Brabender viscosity according to ASTM C474. A final Brabender viscosity is also determined after at least two days of aging.

A crack index value is determined by spreading test compound in a 2¾ inch diameter, ¼ inch deep ring. After drying, a ¼ inch by ¼ inch transparency grid is placed over the compound and the number of squares containing a crack is recorded. Further, the severity of the crack is recorded. Crack severity is subjectively determined to be: hairline, medium, or gorge. A severity coefficient is assigned: (1) for hairline, (2) for medium and (3) for gorge. The number of squares containing a crack is multiplied by the appropriate coefficient. An index is calculated by adding the three quantities. Numerous replicates may be done to allow for a statistical analysis.

Subjective analysis may also be accomplished for a test formulation's creaminess in the pot, workability and bond strength.

Comparative Formulation A

A tape joint composition using the formulation set forth in Table I is prepared as described above and the properties of the composition are shown in Table II.

TABLE I

| Components | Grams |
| --- | --- |
| Limestone (Georgia White No. 9, Georgia Marble Co). | 454.00 |
| Attapulgite Clay (Gel B, The Milwhite Co.) | 15.00 |
| Mica (Mineralite 3X, Mineral Mining Company, Inc.) | 31.00 |
| METHOCEL ™ (The Dow Chemical Company) | 3.00 |
| Binder (UCAR ™ 133) | 18.00 |
| Water | 240.00 |

TABLE II

| | |
| --- | --- |
| Brabender viscosity | Initial-600 |
| | Final-560 |
| Average crack index | 23.6 |
| Crack index, 90 Percent Confidence Limits | 16.4 to 30.8 |
| Creaminess | Acceptable |
| Workability | Acceptable |
| Bond | Acceptable |

METHOCEL ™ is a surface-treated, hydroxymethylcellulose available from the Dow Chemical Company. In the Examples, the METHOCEL ™ used has an average 2 percent viscosity of 75,000 cps.

UCAR ™ 133 is a polyvinyl acetate latex containing, by weight, approximately 56 percent polymer and 38 percent water.

EXAMPLE 1

A tape joint composition using the formulation set forth in Table III is prepared as described above and the properties of this composition are shown in Table IV.

TABLE III

| Components | Grams |
| --- | --- |
| Limestone (Georgia White No. 9, Georgia Marble Co). | 454.00 |
| Attapulgite Clay (Gel B, The Milwhite Co.) | 15.00 |
| Mica (Mineralite 3X, Mineral Mining Company, Inc.) | 31.00 |
| METHOCEL ™ (The Dow Chemical Company) | 2.25 |
| Calcium Oxide, (Verticle, Pulverized, The Mississippi Lime Company) | 0.75 |
| Binder (UCAR ™ 133, Union Carbide Corporation) | 18.00 |
| Water | 210.00 |

TABLE IV

| | |
| --- | --- |
| Brabender viscosity | Initial-560 |
| | Final-620 |
| Average crack index | 3.6 |
| Crack index, 90 Percent Confidence Limits | 0.0–7.4 |
| Creaminess | Acceptable |
| Workability | Acceptable |
| Bond | Acceptable |

These results show that on average, the crack resistance of a tape joint composition containing calcium oxide is significantly improved as compared to one without calcium oxide; 3.6 with calcium oxide and 23.6 without calcium oxide. Also, a t-statistic analysis of the crack index shows that the crack index is improved at least at the 90 percent confidence limits with the use of calcium oxide.

EXAMPLE 2

A tape joint composition is formulated as for Example 1 with calcium hydroxide replacing the calcium oxide. The creaminess, workability and bonding of the formulation is acceptable. The Brabender viscosity and crack index duplicated the findings in Example I. That is, calcium hydroxide imparts improved crack resistance to a tape joint compound without affecting creaminess, workability and bonds in a similar manner as calcium oxide.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A dry powder composition suitable on admixture with water for adhering and covering wallboard joint tapes which comprises from about 40 to about 95 percent limestone, from about 2 to about 30 percent mica, from about 2 to about 30 percent clay, from about 2 to about 15 percent of a binder, from about 0.2 to about 3.0 percent of a water-soluble, surface-treated cellulose ether and from about 0.08 to about 1.53 percent calcium oxide, calcium hydroxide or a mixture thereof, wherein the percent is based on the total weight of the dry components.

2. A tape joint composition having limestone, mica, clay and a binder as principle ingredients, the improvement which comprises using an effective amount of a crack inhibiting additive wherein the additive is a mixture of
   a. between about 15 to about 80 weight percent of a surface-treated cellulose ether; and
   b. between 20 to about 85 weight percent, of calcium oxide, calcium hydroxide or a mixture thereof, wherein the weight percent is based on the total weight of the additive.

3. The tape joint composition of claim 2 wherein the additive is between about 0.25 and about 5.0 weight percent of the total composition.

* * * * *